Figure 1:
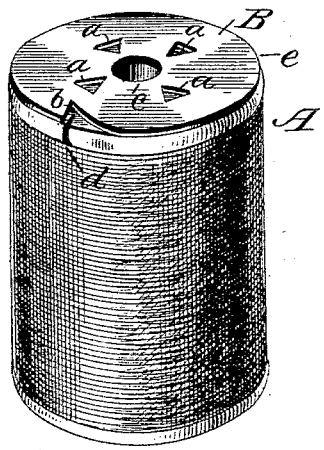

(No Model.) 2 Sheets—Sheet 1.
H. GINTZ.
THREAD CUTTING ATTACHMENT FOR SPOOLS.

No. 566,859. Patented Sept. 1, 1896.

Witnesses
D. J. Williamson.
Geo. M. Smith.

Inventor
Henry Gintz.
per Chas. H. Fowler.
Attorney.

(No Model.) 2 Sheets—Sheet 2.
H. GINTZ.
THREAD CUTTING ATTACHMENT FOR SPOOLS.

No. 566,859. Patented Sept. 1, 1896.

Witnesses
C. J. Williamson
Geo. M. Smith

Inventor
Henry Gintz
per Chas. H. Fowler
Attorney.

THE NORRIS PETERS CO., PHOTO-LITHO., WASHINGTON, D. C.

UNITED STATES PATENT OFFICE.

HENRY GINTZ, OF MILLERSBURG, OHIO.

THREAD-CUTTING ATTACHMENT FOR SPOOLS.

SPECIFICATION forming part of Letters Patent No. 566,859, dated September 1, 1896.

Application filed May 29, 1896. Serial No. 593,536. (No model.)

*To all whom it may concern:*

Be it known that I, HENRY GINTZ, a citizen of the United States, residing at Millersburg, in the county of Holmes and State of Ohio, have invented certain new and useful Improvements in Thread-Cutting Attachments for Spools; and I do hereby declare that the following is a full, clear, and exact description of the same, reference being had to the annexed drawings, making a part of this specification, and to the letters of reference marked thereon.

The present invention has relation to that class of thread-cutting devices adapted for attachment to spools whereby the thread may be conveniently severed after unwinding from the spool the desired length for threading the needle; and the invention consists in a thread-cutting attachment constructed substantially as shown in the drawings, and hereinafter described and claimed.

Figure 2:
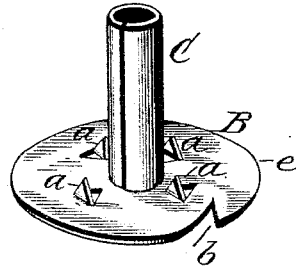
Figure 3:
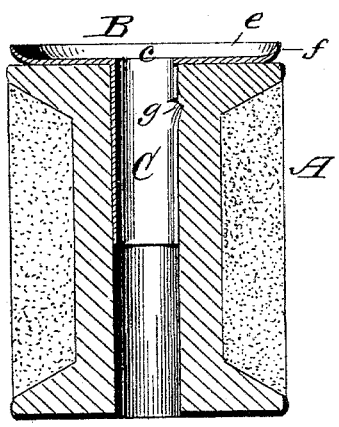
Figure 4:
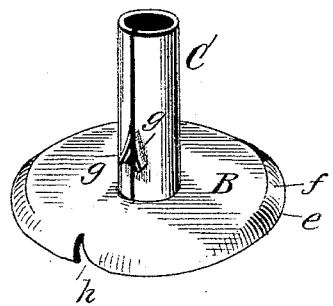

Figure 1 of the drawings is a perspective view of a spool of thread, showing my improved attachment connected thereto; Fig. 2, an under side perspective view of the attachment when removed from the spool; Fig. 3, a sectional elevation showing a modification of the device, said device being shown in position on the spool; Fig. 4, an under side perspective view of the modified form of the device detached from the spool.

In the accompanying drawings, A represents a spool of thread of the usual form, which is shown to illustrate the application of my invention thereto.

The attachment consists of a circular plate or disk B, of thin sheet metal, which is stamped or otherwise formed with spurs *a* upon its under side at an angle to the plane of said plate or disk, as shown in Figs. 1 and 2 of the drawings. This plate or disk B has a notch *b* on its edge or periphery, so that when the plate or disk is in position the notch will come opposite the usual slit *d* and expose the same, whereby the thread may be engaged therewith after removing the severed portion with which the needle is to be threaded. The plate or disk B is preferably provided with a longitudinally-split expansible tubular stem C, which joins the central opening *c* in the plate or disk, said tubular stem serving the purpose of preventing any lateral strain on the spurs *a* after they have been embedded in the fibers of the wood to hold the plate or disk securely in position upon the end of the spool.

The tubular stem when inserted in the central hole of the spool will contract, and in its tendency to expand against the sides of the hole it will be held in position by frictional contact therewith and thus form a brace and support for the plate or disk.

The plate or disk B has a cutting edge around its entire periphery, as shown at *e*, and against the cutting edge the thread is brought in contact and drawn back and forth until severed.

In Figs. 1 and 2 the plate or disk is shown as perfectly flat, but in Figs. 3 and 4 I have shown it with an upturned flange *f* with the cutting edge *e*, and the spurs *a* on the disk are dispensed with and in place thereof suitable spurs *g*, formed on the tubular stem C, which spurs embed themselves in the fibers of the wood by the expansion of the stem when inserted in the central hole of the spool. The plate or disk shown in Figs. 3 and 4 may be provided with a slit *h* to take the place of the usual slit *d* on the end of the spool to hold the end of the thread and prevent it from unwinding. The plate or disk and the tubular stem may be spun from a single piece of sheet metal or stamped or otherwise formed separately and afterward connected together in any suitable manner, and any such changes in the details of construction as would come within ordinary mechanical skill may be made without departing from the principle of my invention.

Having now fully described my invention, what I claim as new, and desire to secure by Letters Patent, is—

1. A thread-cutting attachment for spools, consisting of a notched and flat circular plate having a continuous cutting edge around its periphery and uninterrupted except by the notch, and an expansible tubular stem upon the under side of the plate, said tube being of a uniform diameter throughout its length whereby the entire circumference of the stem will be brought in frictional contact with the wall of the opening in the spool, and means for holding the attachment securely to the spool, substantially as and for the purpose set forth.

2. A thread-cutting attachment for spools, consisting of a notched circular dish-shaped plate having an upturned cutting edge around its circumference, and an expansible tubular stem upon the under side of the plate, substantially as and for the purpose specified.

In testimony that I claim the above I have hereunto subscribed my name in the presence of two witnesses.

HENRY GINTZ.

Witnesses:
 GEORGE VOGEL,
 GEO. W. HULL.